United States Patent [19]

Wada et al.

[11] Patent Number: 4,793,695
[45] Date of Patent: Dec. 27, 1988

[54] ELECTROCHROMIC DISPLAY DEVICE

[75] Inventors: Shuichi Wada; Tsunemi Ohiwa; Hirokazu Kidou; Akira Kawakami; Toshikatsu Manabe, all of Osaka, Japan

[73] Assignee: Hitachi Maxell, Ltd., Osaka, Japan

[21] Appl. No.: 71,174

[22] Filed: Jul. 8, 1987

[30] Foreign Application Priority Data

Jul. 8, 1986 [JP] Japan ............................. 61-160410

[51] Int. Cl.$^4$ ................................................ G02F 1/01
[52] U.S. Cl. ................................................ 350/357
[58] Field of Search ........................ 350/357; 342/785

[56] References Cited

U.S. PATENT DOCUMENTS 3,879,108  4/1975  Berets ............................. 350/357
4,116,546  9/1978  Leibowitz ....................... 350/357

FOREIGN PATENT DOCUMENTS 0138720  10/1980  Japan ............................. 350/357
0038417   3/1982  Japan ............................. 350/357
0211124  12/1982  Japan ............................. 350/357

Primary Examiner—Eugene R. LaRoche
Assistant Examiner—Nathan W. McCutcheon
Attorney, Agent, or Firm—Birch, Stewart, Kolasch & Birch

[57] ABSTRACT

An electrochromic display device which comprises a display electrode comprising a transparent substrate, a transparent electrode formed on an inner surface of the transparent substrate and an electrochromic material layer for display made of tungstgen oxide and formed on the transparent electrode; a counter electrode comprising a substrate, a conductive layer formed on an inner surface of the substrate and an activated carbon fiber cloth bonded to the conductive layer with a conductive adhesive; and a spacer provided beween the display electrode and the counter electrode with their inner surfaces facing to each other to define, between them, an electrolyte chamber, which is filled with an electrolyte comprising LiClO$_4$ dissolved in propylene carbonate containing water and an acid, which device has an increased original injected charge and good maintenance of the injected charge after prolonged storage.

13 Claims, 1 Drawing Sheet

ELECTROCHROMIC DISPLAY DEVICE

BACKGROUND OF THE INVENTION

1. Field of the Invention

The present invention relates to an electrochromic display device. More particularly, it relates to an electrochromic display device which utilizes tungsten oxide as an electrochromic compound and an activated carbon fiber cloth as a counter electrode material.

2. Description of the Prior Art

A typical electrochromic display device comprises a display electrode comprising a transparent substrate, a transparent electrode formed on an inner surface of the transparent substrate and an electrochromic material layer for display made of tungsten oxide and formed on the transparent electrode; a counter electrode comprising a substrate, a conductive layer formed on an inner surface of the substrate and a counter electrode material; and a spacer provided between the display electrode and the counter electrode with their inner surfaces facing to each other to shield them to define, between them, an electrolyte chamber which is filled with an electrolyte.

Such an electrochromic display device utilizes the coloring of the electrochromic material by applying voltage between the the display electrode and the counter electrode through the electrolyte.

Generally, tungsten oxide ($WO_3$) is used as an electrochromic material, and a lithium salt is used as an electrolyte. In such a combination of the electrochromic material and the electrolyte, tungsten oxide turns to blue according to the following reaction:

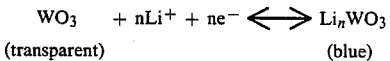

$$WO_3 + nLi^+ + ne^- \longleftrightarrow Li_nWO_3$$
(transparent) (blue)

Usually, as the counter electrode material, carbon fiber cloth, $WO_3$ powder or $MnO_2$ powder is used. Among them, the carbon fiber cloth is preferably used because of its large injected charge.

However, it was found that the injected charge gradually decreases during storage when the carbon fiber cloth is used as the counter electrode material. Then, a study was made by the present inventors to determined how to prevent such degradation of the injected charge.

It is known to add an acid to the electrolyte to prevent tungsten oxide from dissolving in the electrolyte (cf. for example, Japanese Patent Kokai Publication No. 138720/1980). However, since the electrochromic display device of said patent application does not utilize the carbon fiber cloth, its injected charge is small, which is far from the desired property of an electrochromic display device.

SUMMARY OF THE INVENTION

An object of the present invention is to provide a highly reliable electrochromic display device in which an original large injected charge can be maintained as long as possible.

Accordingly, an electrochromic display device of the present invention comprises a display electrode comprising a transparent substrate, a transparent electrode formed on an inner surface of the transparent substrate and an electrochromic material layer for display made of tungsten oxide and formed on the transparent electrode; a counter electrode comprising a substrate, a conductive layer formed on an inner surface of the substrate and an activated carbon fiber cloth bonded to the the conductive layer with a conductive adhesive; and a spacer provided between the display electrode and the counter electrode with their inner surfaces facing to each other to shield them to define, between them, an electrolyte chamber, which is filled with an electrolyte comprising $LiClO_4$ dissolved in propylene carbonate containing water and an acid.

DETAILED DESCRIPTION OF THE INVENTION

In the course of the study to develop the electrochromic display device of the present invention, it was supposed that the decrease of injected charge may be attributed to partial deactivation of the tungsten oxide film used as the electrochromic material which is caused by an adverse influence of the activated carbon fiber cloth on the properties of the electrolyte. Then, as a result of extensive study to find a measure to suppress the adverse influence of the activated carbon fiber cloth on the electrolyte, it has been found that when $LiClO_4$ is used as a lithium salt in the electrolyte and propylene carbonate is used as the non-aqueous medium, addition of water together with the already proposed acid to the electrolyte can greatly suppress the adverse influence of the activated carbon fiber cloth on the electrolyte and in turn the decrease of the injected charge during storage of the electrochromic display device and further increase the original large injected charge.

Figure 1:
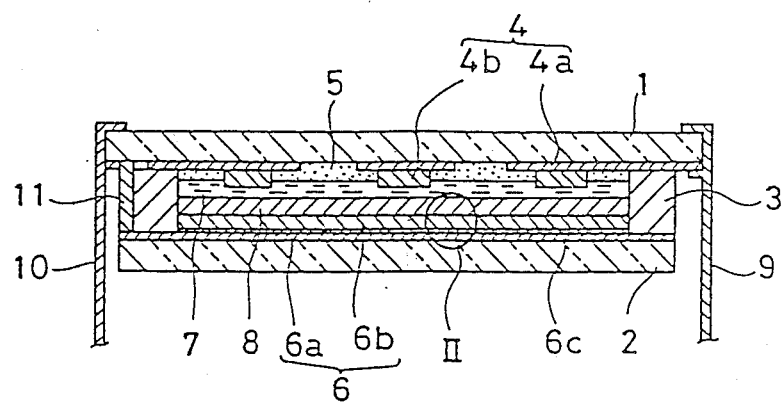
FIG. 1 is a cross section of an electrochromic display device according to the present invention.
Figure 2:
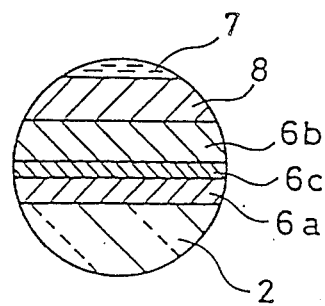
FIG. 2 is an enlarged cross section of a part of the device encircled by a circle II in FIG. 1.

The present invention will be illustrated by making reference to the drawings in which FIGS. 1 and 2 which show an embodiment of the electrochromic display device of the present invention.

In FIG. 1, a substrate 1 is made of a transparent material such as glass, display electrode 4 having a certain pattern comprises a transparent electrode 4a made of an indium-tin oxide (ITO) or $SnO_2$ thin film of 1,000 to 3,000 Å in thickness formed on the transparent substrate 1 by vacuum deposition, spattering, ion plating and the like, and an electrochromic material layer 4b is made of a tungsten oxide film of 3,000 to 7,000 Å in thickness, which can be formed on the transparent electrode 4a by the same method as used for the formation of the transparent electrode 4a.

On an inner surface of of a substrate 2, a conductive layer 6a made of an electrically conductive material such as noble metal or metal oxide is provided, and an activated carbon fiber cloth 6b is fixed on the conductive layer 6a by a conductive adhesive 6c comprising a binder and electrically conductive particles such as carbon so as to constitute a counter electrode 6.

The display electrode 4 and the counter electrode 6 are separated by a spacer 3. An electrolyte chamber is defined by said spacer 3 and both electrodes 1 and 2 and filled with an electrolyte 7.

Usually, the electrolyte comprises $LiClO_4$ dissolved in propylene carbonate. As the non-aqueous medium, propylene carbonate is used since it has a high boiling point and does not dissolve the tungsten oxide film. The concentration of $LiClO_4$ is preferably from 0.5 to 1.5 mole/liter.

According to the present invention, the electrolyte 7 contains water and an acid. The acid may be an organic or inorganic acid. Among them, the organic acid such as acetic acid and propionic acid is particularly useful.

Each of water and the acid is added to the electrolyte in an amount of 0.3 to 2.0% by volume, preferably 0.3 to 1.5% by volume, more preferably 0.7 to 1.2% by volume based on the whole volume of the electrolyte. When the amount of water or the acid is smaller than the above lower limit, the original injected charge and its maintenance are not improved. When it is larger than the above upper limit, the tungsten oxide film is dissolved in the electrolyte as the time passes so that the injected charge tends to decrease.

An amount of water and the acid may be arbitrary in the above range and preferably the water and the acid are added in a nearly equal amount.

A reflector 8 is provided between the display electrode 4 and the counter electrode 6 to conceal the counter electrode 6 so that its own color is used as a background of the display. The reflector may be formed by a conventional method. For example, a sheet made of a mixture of a pigment such as titanium oxide and polytetrafluoroethylene powder is adhered to a surface of the counter electrode 6, or a gel of the pigment and the electrolyte is coated on the surface of the counter electrode 6 by screen process printing. An enlarged layered structure on the counter electrode side is shown in FIG. 2.

Leads 9 and 10 are connected to edges of the substrates 1 and 2, respectively. Further, a conductive coating 11 is provided for electrically connecting the lead 10 and the conductive layer 6a. The conductive coating 11 may be formed by silver paste and the like.

As understood from the above construction of the electrochromic display device of the present invention, when a voltage is applied between the display electrode 4 and the counter electrode 6, the electrochromic layer turns to blue, whereby a desired pattern appears.

As described above,, the activated carbon fiber cloth constituting the counter electrode material layer 6b adversely influences the electrolyte 7, thus partially deactivating the tungsten oxide film constituting the electrochromic material layer 4b and in turn decreasing the injected charge after prolonged storage of the display device. However, such degradations can be overcome by the addition of both water and acid to the electrolyte. That is, the water and the acid act to decrease the adverse influence of the activated carbon fiber cloth on the electrolyte to prevent the partial deactivation of the tungsten oxide film.

The detailed mechanisms of the adverse influence of the activated carbon fiber cloth on the electrolyte and in turn the partial deactivation of the tungsten oxide film have not been thoroughly studied. But, they may be supposed as follows:

The activated carbon fiber cloth is activated by steam to increase their specific surface area. When such activated carbon fiber cloth is immersed in an electrolyte comprising a solution of the lithium salt in the non-aqueous medium, it tends to gradually make the pH of the electrolyte alkaline. The tungsten oxide film has a property to trap lithium ions in the electrolyte through a reaction between the lithium ions and hydroxyl groups in the tungsten oxide film. Since this reaction is accompanied with liberation of hydrogen into the electrolyte, it quickly reaches equilibrium and no further reaction proceeds. However, when the electrolyte is made alkaline by the activated carbon fiber cloth, the above reaction equilibrium is broken so that the lithium ions are excessively trapped by the tungsten oxide film and as the result, the tungsten oxide film is partially deactivated.

According to the present invention, since water and acid are added to the electrolyte, the alkalization of the electrolyte due to the activated carbon fiber cloth is effectively suppressed by a synergistic effect by the water and the acid which act as donors of hydrogen ions. Such suppression of alkalization of electrolyte is achieved by the addition of water and acid which are more effective than the addition of acid alone. Therefore, according to the present invention, fewer lithium ions are trapped by the tungsten oxide film and the injected charge does not greatly decrease even after prolonged storage.

The present invention will be illustrated by following examples.

EXAMPLE 1

On one side of a transparent substrate made of a glass plate of 40 mm in width, 120 mm in length and 1.1 mm in thickness, a display electrode with a suitable pattern and an electrochromic material layer were formed by vacuum deposition, respectively. The displaying electrode was made of ITO having a thickness of 2,000 Å. The electrochromic material layer consisted of six 8-figured patterns. Each pattern consisted of 7 segments and was made of a tungsten oxide film having a thickness of 5,000 Å. Further, the exposed surface area of the substrate and the display electrodes were covered with a protective layer made of $SiO_2$ having a thickness of 5,000 Å.

On a whole area of one surface of a counter electrode substrate made of a glass plate of 36 mm in width, 116 mm in length and 1.1 mm in thickness, a counter electrode made of ITO having a thickness of 4,000 Å was formed by vacuum deposition. On the ITO layer, a carbon resin ink comprising a paste containing a phenol-novolak type epoxy resin and carbon black (trade name "RP-10" of Tokuriki) was screen printed to a thickness of 100 μm. Then, an activated carbon fiber cloth (trade name "CH 20" of Kurare) was fixed with the carbon resin ink and thermally cured at 200° C. for 4 hours to form a counter electrode.

Both substrate plates were bonded and sealed by an epoxy adhesive with the display electrode and the counter electrode facing to each other and with the insertion therebetween of a reflector and the placing of a spacer on the peripheral portion of the substrate. The reflector consisted of a 0.3 mm thick sheet material made of a mixture of a titanium oxide pigment and polytetrafluoroethylene (trade name "POREFLON" of Sumitomo Electric Industries, Ltd.) and the spacer had a thickness of 0.8 mm and consisted of polyester resin. In a space between the substrates, enclosed was about 4 ml of an electrolyte prepared by dissolving $LiClO_4$ in propylene carbonate in a concentration of 1 mole/liter containing 0.3% by volume of acetic acid and 0.3% by volume of water. Finally, leads were attached and a conductive layer was formed by coating a silver paste to form an electrochromic display device having a structure as shown in FIGS. 1 and 2.

EXAMPLES 2-10

In the same manner as in Example 1 but changing the amount and kind of an acid and an amount of water to be added to the electrolyte as shown in the Table, each electrochromic display device was produced.

COMPARATIVE EXAMPLES 1-4

In the same manner as in Example 1 but adding only an acid to the electrolyte, each comparative electrochromic display device was produced.

COMPARATIVE EXAMPLE 5

In the same manner as in Example 1 but adding only water to the electrolyte, a comparative electrochromic display device was produced.

COMPARATIVE EXAMPLE 6

In the same manner as in Example 1 but adding no acid and no water, a comparative electrochromic display device was produced.

To compare the performance of the electrochromic display devices produced in Examples and Comparative Examples, electrical quantity, namely the injected charge, was measured by applying rectangular wave AC voltage ($\pm 1.2$ V, 0.6 sec.) between the display electrode and the counter electrode. Then each element was kept in a thermostatic chamber kept at 45° C. for 100 days. Thereafter, the injected charge was again measured in the same manner as above. From the original injected charge and that after 100 day storage at 45° C., a maintenance rate of injected charge was calculated. The results are shown Table.

TABLE

| Example No. | Additives in electrolyte | | Injected charge (mc/cm$^2$) | | Maintenance rate (%) |
|---|---|---|---|---|---|
| | Acid (vol %) | Water (vol %) | Original | After 100 days | |
| 1 | Acetic acid (0.3) | 0.3 | 11 | 9.6 | 87 |
| 2 | Acetic acid (1.5) | 1.5 | 12 | 10.8 | 90 |
| 3 | Acetic acid (2.0) | 2.0 | 12 | 10.2 | 85 |
| 4 | Propionic acid (0.3) | 0.3 | 11 | 9.7 | 88 |
| 5 | Propionic acid (1.5) | 1.5 | 12 | 10.9 | 91 |
| 6 | Propionic acid (2.0) | 2.0 | 12 | 10.0 | 83 |
| 7 | Acetic acid (0.5) | 0.5 | 11 | 9.8 | 89 |
| 8 | Acetic acid (1.0) | 1.0 | 12 | 10.9 | 89 |
| 9 | Propionic acid (0.5) | 0.5 | 11 | 9.8 | 89 |
| 10 | Propionic acid (1.0) | 1.0 | 12 | 10.9 | 91 |
| Comp. 1 | Acetic acid (0.3) | — | 8 | 6.0 | 75 |
| Comp. 2 | Acetic acid (1.5) | — | 9 | 7.2 | 80 |
| Comp. 3 | Propionic acid (0.3) | — | 8 | 5.9 | 74 |
| Comp. 4 | Propionic acid (1.5) | — | 9 | 7.0 | 78 |
| Comp. 5 | — | 1.0 | 12 | 4 | 33 |
| Comp. 6 | — | — | 9 | 4.5 | 50 |

What is claimed is:

1. An electrochromic display device which comprises:
    a display electrode comprising a transparent first substrate which has an inner surface, a transparent electrode formed on said inner surface of said transparent first substrate, and an electrochromic material layer for display made of tungsten oxide and formed on said transparent electrode;
    a counter electrode comprising a second substrate which has an inner surface that faces said inner surface of said transparent first substrate, a conductive layer formed on said inner surface of said second substrate, and an activated carbon fiber cloth bonded to said conductive layer with a conductive adhesive; and
    a spacer means provided between said display electrode and said counter electrode so as to define an electrolyte chamber, which is filled with an electrolyte comprising LiClO$_4$ dissolved in propylene carbonate and containing water and an acid.

2. The electrochromic display device according to claim 1, wherein said acid is acetic acid or propionic acid.

3. The electrochromic display device according to claim 1, wherein each of said water and acid is contained in said electrolyte in an amount of from 0.3 to 2.0% by volume based on the whole volume of said electrolyte.

4. The electrochromic display device according to claim 3, wherein each of said water and acid is contained in said electrolyte in an amount of from 0.5 to 1.5% by volume based on the whole volume of said electrolyte.

5. The electrochromic display device according to claim 4, wherein each of said water and acid is contained in said electrolyte in an amount of from 0.7 to 1.2% by volume based on the whole volume of said electrolyte.

6. The electrochromic display device according to claim 3, wherein said water and acid are contained in said electrolyte in substantially the same amounts.

7. The electrochromic display device according to claim 1, wherein the concentration of LiClO$_4$ in said electrolyte is an amount of from 0.5 to 1.5 mole/liter.

8. The electrochromic display device according to claim 5, wherein said water and acid are contained in said electrolyte in substantially the same amounts.

9. The electrochromic display device according to claim 2, wherein each of said water and acid is contained in said electrolyte in an amount of from 0.3 to 2.0% by volume based on the whole volume of said electrolyte, and wherein said transparent electrode comprises indium-tin oxide or SnO$_2$, said conductive layer comprises an electrically conductive noble metal or metal oxide, and said conductive adhesive comprises a binder and electrically conductive particles.

10. The electrochromic display device according to claim 9, wherein said device further comprises a reflector provided between said display electrode and said counter electrode, and wherein the concentration of LiClO$_4$ in said electrolyte is an amount of from 0.5 to 1.5 mole/liter.

11. The electrochromic display device according to claim 10, wherein said transparent electrode comprises indium-tin oxide, said transparent first substrate and said second substrate comprise glass, and said reflector comprises a mixture of titanium oxide pigment and polytetrafluoroethylene.

12. The electrochromic display device according to claim 11, further comprising first and second electrical leads operatively connected to said transparent first substrate and second substrate, and a conductive coating for electrically connecting said second lead and said conductive layer.

13. The electrochromic display device according to claim 12, wherein said transparent electrode has a thickness of from 1,000 to 3,000 angstroms and said electrochromic material layer has a thickness of from 3,000 to 7,000 angstroms.

* * * * *